INTERCONNECTION NETWORK

Filed Dec. 31, 1963 3 Sheets-Sheet 1

INVENTOR
LESTER M. SPANDORFER

BY William E. Cleaver

ATTORNEY

Aug. 27, 1968 L. M. SPANDORFER 3,399,380

INTERCONNECTION NETWORK

Filed Dec. 31, 1963 3 Sheets-Sheet 3

3,399,380
Patented Aug. 27, 1968

3,399,380
INTERCONNECTION NETWORK

Lester M. Spandorfer, Cheltenham, Pa., assignor to Sperry Rand Corporation, New York, N.Y., a corporation of Delaware Filed Dec. 31, 1963, Ser. No. 334,889
5 Claims. (Cl. 340—147)

ABSTRACT OF THE DISCLOSURE

The present system involves first and second sets of interconnecting networks which enable a connection to be made from any terminal of said first set through said second set to any other terminal of said first set. In order to provide a completely non-blocking system, the number of individual networks in the second set is equal to one less than four times the number of connectable terminals of an individual network of said first set.

This invention relates to a network for interconnecting associated circuits, and more particularly to a non-blocking interconnecting network to be employed in an electrical circuit system.

For instance in a computer or data processing system, it is the general practice that hundreds and more likely thousands of electrical circuits must be connected together in a predetermined pattern. These circuits can be connected by hand wiring from one terminal of one circuit to another terminal of another circuit, alternatively, in another way, by employing stacks of printed wiring, wherein one level of printed wiring overlays another level of printed wiring, and between which there is a pattern of interconnecting electrical paths.

The hand wiring scheme is cumbersome, space demanding and costly, and therefore has given way to the printed circuit method. While the prior art, printed wiring method has merit, it does have certain shortcomings in that the path configurations of the printed circuit must be predetermined before fabrication and the terminals wired in a point to point manner. Such a procedure is also costly and time consuming. In addition the prior art printed wiring interconnecting schemes have not been very flexible, i.e., not usually expandible or easily rearranged.

The present invention provides maximum flexibility with respect to rearranging and expanding or detracting, as well as an operative circuit path which can be fabriccated without knowledge about the required specific circuit path.

Accordingly, it is an object of the present invention to provide an improved interconnecting means.

It is a further object of the present invention to provide an interconnecting network circuit which has a relatively short circuit path between any two terminals thereof, and which therefore gives rise to a minimal amount of stray capacitance or inductive coupling, and therefore a minimal amount of noise.

It is a further object of the present invention to provide an interconnecting network which is highly flexible and which can therefore be easily expanded, rearranged, reduced and easily repaired.

It is a further object of the present invention to provide an interconnecting network which can be fabricated and made available for a logic system, such as that used in a computer, prior to the designer's knowledge about the final arrangement of the logic system.

In accordance with a feature of the present invention there are provided two sets of interconnection networks. The second set of networks acts to connect any two of the first set of networks, and there are sufficient circuit paths available such that any circuit terminal can be connected to any other circuit terminal without encountering a blocking situation.

In accordance with another feature of the present invention in order to accomplish a completetly non-blocking situation the number of second set matrices is equal to one less than four times the number of terminals to any first set matrix.

In accordance with another feature of the present invention the second set of networks is arranged to be disposed orthogonal to a plurality of first network units in order to provide a small package arrangement, and minimum path lengths for the overall system.

The above mentioned and other features and objects of this invention will become more apparent by reference to the following description of an embodiment of the invention taken in conjunction with the accompanying drawings wherein.

Figure 5A:
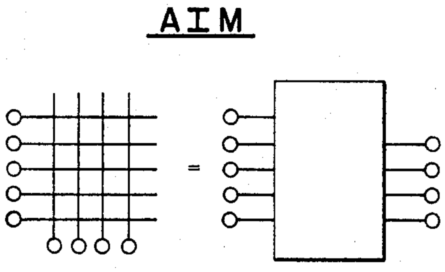
Figure 6:
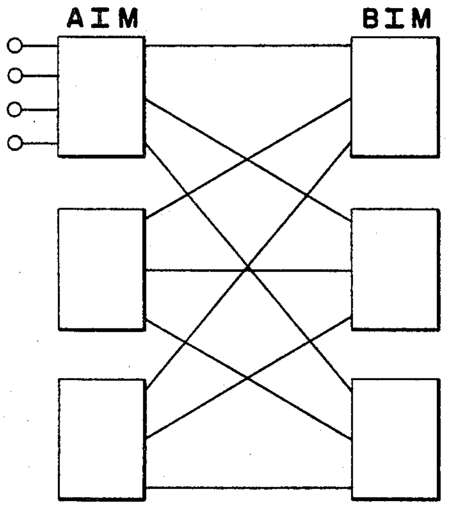
Figures 7, 8:
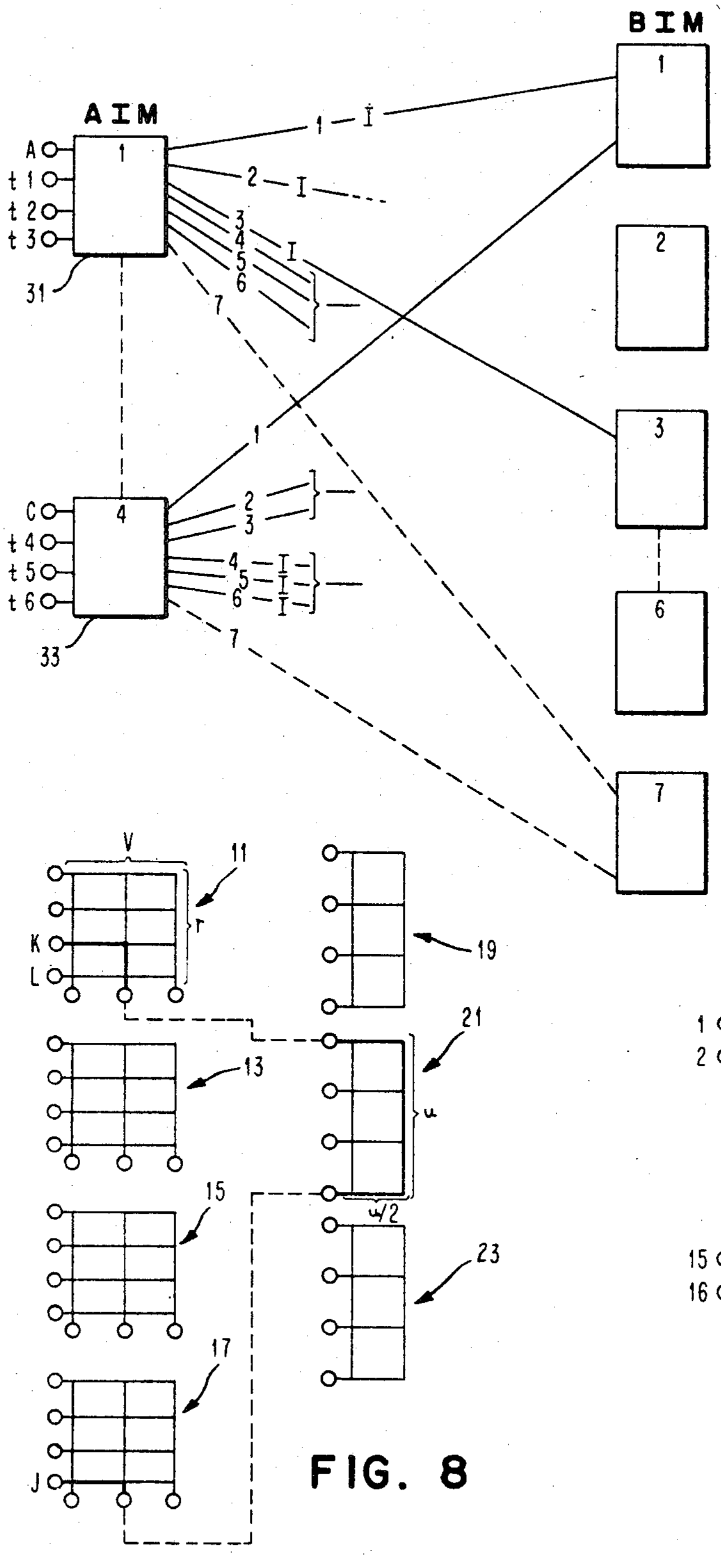
Figure 9:
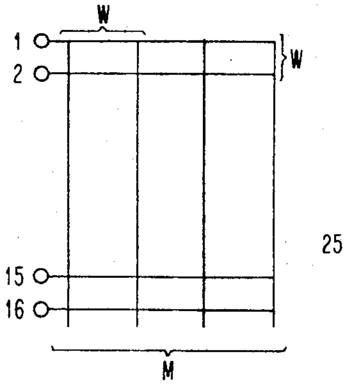
Figure 10:
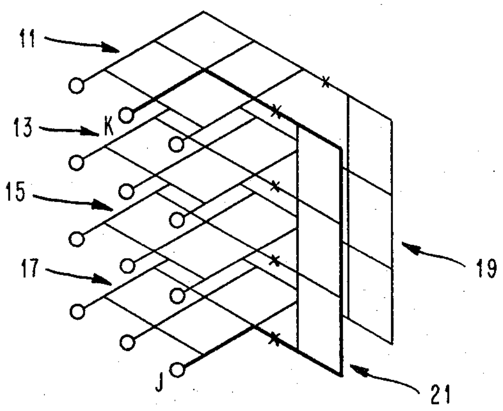
Figure 11:
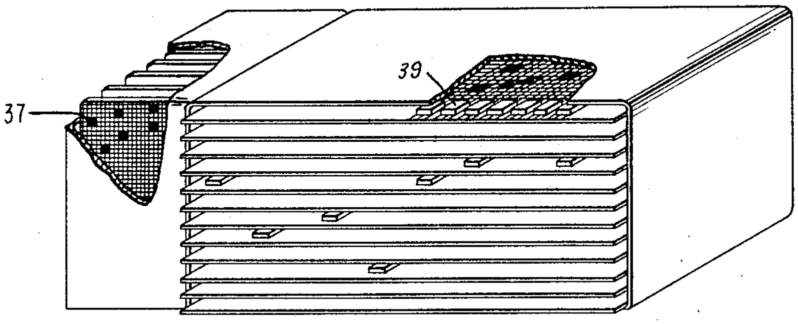

FIGURES 5*a* and *b* show equivalents for schematic blocks;

FIGURE 6 shows a two stage matrix arrangement;

FIGURE 7 is a schematic block diagram of first and second sets of matrices;

FIGURE 8 is a schematic diagram of an interconnecting circuit;

FIGURE 9 is a schematic diagram of a planar circuit;

FIGURE 10 is a schematic diagram of an orthogonally connected interconnecting circuit;

FIGURE 11 is a pictorial schematic of an orthogonally connected interconnecting circuit.

*General description and definitions*

Figure 1:
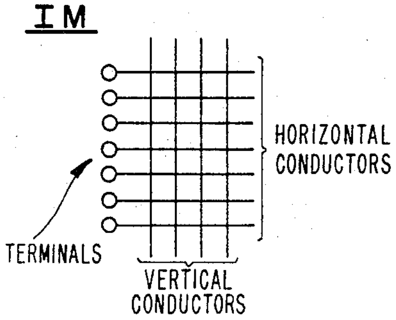
FIGURE 1 is a schematic drawing of an interconnection matrix.

One general approach to achieving flexibility with respect to rearranging and expanding or detracting and with respect to achieving a high degree of automation in fabrication is through the use of an interconnection network known as an interconnection matrix (IM) shown in FIGURE 1. This network in its most basic form consists of a number of terminals and two sets of conductive lines or paths. One set of conductors is shown to be horizontal and the other set vertical. Each horizontal path is connected to a terminal. The horizontal and vertical paths are not in general electrically connected to one another, insulation being provided between the two sets of conductors to achieve this.

Figure 2:
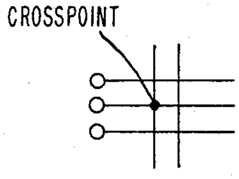
FIGURE 2 is a schematic drawing of an interconnection matrix showing a crosspoint.
Figure 3:
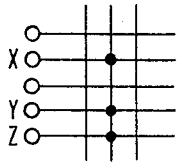
FIGURE 3 is a schematic drawing of an interconnection matrix showing connection between three terminals.

The function of the interconnection matrix hereinafter referred to as IM is to provide a conducting path from any terminal to any other terminal or group of terminals. Not shown in FIGURE 1 are the electric circuits which are connected to the terminals, and which are in fact the devices that ultimately are to be connected together. For purposes of this description it suffices to speak of simply interconnecting the terminals shown in FIGURE 1. An electrical connection between a horizontal and a vertical conductor is made by one or a combination of various mechanical or chemical means of effectively removing the insulation at an intersection of a pair of horizontal and vertical conductors and joining the conductors. Such a connection will be called the cross-point. The symbol for a cross-point is shown in FIGURE 2. Thus one way of making a complete electric path between three terminals is shown in FIGURE 3, and requires three cross-points.

Figure 4:
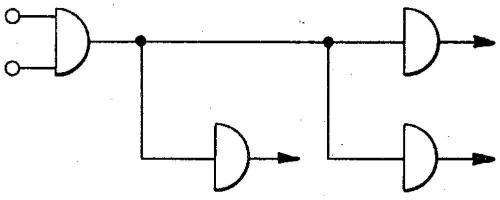
FIGURE 4 is a schematic drawing showing a logical chain.

In the general employment of logic circuits every basic logic building block has essentially one output terminal, although several terminals are occasionally needed (for multiple output logic circuits). For descriptive purposes herein, and without any significant loss of generality, we will limit this discussion to one output terminal per basic logic circuit. Further it should be understood that, in general, with respect to logic circuits each basic circuit has a plurality of input terminals. In the general practice of interconnection of logic circuits the output of one circuit will control or drive the inputs of a plurality of other logic circuits. This is generally accomplished by an *output chain*, as shown in FIGURE 4. Clearly then if we supply sufficient horizontal conductors to equal or exceed the total number of terminals of all the circuits to be serviced by the interconnection network, and if we supply a number of verticals equal to or greater than the total number of output terminals, the IM so constructed will be able to interconnect the circuits according to any desired pattern whatsoever. The capacity of the interconnection circuit to interconnect the circuits according to any desired pattern shall be known and referred to hereinafter as Property 1.

Furthermore, the sequence of making the specific cross-points in the IM so constructed is immaterial. That is, the order in which the cross-points are fabricated is of no consequence. This shall be known and referred to as Property 2. An IM which has fewer vertical conductors than output terminals does not satisfy Property 1. Property 2 is not relevant to an IM as considered thus far but we shall see that it, as well as Property 1, are relevant to the interconnection arrangement which constitutes the subject invention.

Interconnection networks which have both Properties 1 and 2 are called strictly non-blocking; those that have only Property 1 may be called essentially non-blocking Essentially non-blocking interconnection networks are those that require a specific or preplanned order of the sequence in which the cross-points are fabricated; that is, not every sequence will result in a non-blocking network. By "non-blocking" is meant the capacity to always provide a path between two terminals which path is not in use.

Figure 5B:
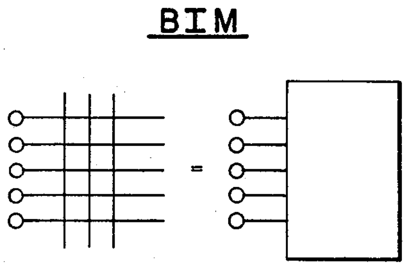

For convenience, an IM will occasionally be depicted as shown in the right-hand portion of FIGURE 5. In FIGURE 5 the original terminals remain unchanged in position, and we now assign terminals to the vertical conductors, which are depicted on the right-hand side of the box. An IM which has both left-hand and right-hand terminals will be referred to as an AIM, while an IM which has only one set of terminals will be referred to as BIM.

FIGURE 6 shows a manner in which a group of smaller IM's can themselves be interconnected to perform the same function as a single larger IM. This interconnection network will be referred to as a two stage array of interconnection matrices or, for brevity, a two-stage array. The first stage consists of a set of AIM's and will be denoted the A stage. The second stage consists of a set of BIM's and will be denoted the B stage. The basic terminals to be interconnected are the A stage left-hand terminals; all others are intermediate terminals. Each AIM has one connecting link assigned to each BIM as shown.

A connecting path between several terminals on a given AIM can be made entirely within that AIM. This will be known as a short path, and is shown as K to L in FIGURE 8. A connecting path between several terminals on different AIM's will be known as a long path; for example, and is shown as K to J in FIGURE 8.

By providing the two different standard types of matrices and arranging them so that connections from one AIM to a second AIM is through a BIM interconnection circuitry can be provided for ready connection before any of the logical circuitry is arranged. If additional interconnecting circuitry is necessary, it is a simple matter to add more modules of the AIM and BIM types and secondly since there is always a provision to go from any terminal of an AIM to any other terminal of another AIM, it follows that there is always an electrical continuity path from any logical component circuit to any other logical component circuit with which the interconnecting system is used.

Examine FIGURE 7 wherein there is shown and/or indicated four AIM stages. Each of the stages is shown to have four terminals and four terminal-conductors, as well as seven connecting links or connecting conductors. In the worst case situation to be considered below, we assume that each matrix has at least six connecting conductors. This assumption is made so that the threshold point, or the number of connecting conductors beyond which the situation changes, might be considered immediately. In other words, if the assumption has been made that each of the AIM's needed only three connecting conductors, then it would be determined that a blocking situation occurs. If the number of connecting conductors were increased by one to overcome the blocking situation, eventually each AIM would be found to have six connecting conductors and still a blocking situation would exist. Beyond six connecting conductors in our particular case the situation changes and therefore we start our consideration with six connecting conductors, being requisite for each AIM.

Consider now a worse case situation where, in particular in FIGURE 7, we want to transmit a signal from terminal A of AIM 31 to terminals C of AIM 33. In our worse case situation further assume that the connecting conductors 1, 2 and 3 are in use because AIM 31 has connections made from terminals T1, T2 and T3 to the second and third AIM's which are not shown.

In accordance with the worse case situation, further assume that the connecting conductors 4, 5 and 6 as connected to AIM 33 are also in use because of connections from T4, T5 and T6 to the second and third stage of AIM's (not shown). If we carefully examine FIGURE 7, we find we cannot connect or transmit a signal from terminal A to terminal C, if we only have six BIM's each of which has four connecting conductors, and if we only have six connecting conductors on each AIM. The foregoing is true because a signal which is applied to A cannot be transmitted from AIM 31 to any of the conductors 1, 2 and 3 since these conductors are in use, nor can such a signal be received or transmitted on conductors 4, 5 and 6 of the AIM 33 because at the latter IM these links are busy. It follows then that in order to connect terminal A of AIM 31 to terminals C of AIM 33 a seventh BIM must be employed.

If the second and third stage AIM's are added to FIGURE 7 and there is an attempt to diagrammatically connect any AIM terminals with any other AIM terminal, and in accordance therewith, if each of the IM's have three of their connecting links busy or in use (such as the connecting conductors 1, 2 and 3 of AIM 31, and a corresponding three connecting conductors at some other IM such as conductors 4, 5 and 6), it will be shown that there will be a blocking situation unless a seventh BIM is added to the arrangement. If a seventh BIM is added, a non-blocking situation is provided for all of the remaining terminals which cannot otherwise be connected. The full lay-out of such a diagram was not included herewith, for purposes of simplicity. Such a diagram with its many many cross lines becomes confusing. However, it can be shown by a careful lay-out that the seventh BIM is necessary to provide the non-blocking situation between any two terminals of different AIM's and in mathematical terms this can be set down as $v=2r-1$, where $v$ is the number of BIM's and $r$ is the number of terminals to any AIM. It has been assumed herein that each AIM has exactly $r$ terminals. If the terminals are not distributed equally to all AIM's, then the expression for $v$ becomes somewhat more complex and the basic structure of FIGURE 7 may become less symmetrical, although there is no change in the principle.

If sufficient BIM's are provided to achieve the relationship $v=2r-1$ then the resulting overall interconnection network is strictly non-blocking for any pair of terminals, that is, it satisfies Properties 1 and 2.

As is apparent the foregoing example deals with a non-blocking circuit path between any two terminals of different AIM's but does not take care of the situation that would be necessary for a computer device wherein the signal applied to any terminal might have to drive or go to many other circuits for instance the 6 or 7 circuits. Therefore, extending the foregoing example, let us consider the presence of a third AIM which has an input terminal E. Let us consider that we want to connect a circuit path from the input terminal A to input terminal C as well as from input terminal C to input terminal E. This circuit path is accomplished by adding a second vertical conductor which is available to the horizontal conductor assigned to terminal C. Since terminal C has two vertical paths available we shall refere to it as being bifurcated. It follows that if further we bifurcate the terminal E, we can transmit a signal from the terminal A to the terminals C and E and to a further terminal on some other AIM, etc.

The foregoing reasoning leads us to the conclusion that for a strict non-blocking case we must allow for one bifurcation or for one additional vertical conductor at each terminal. This has the effect of doubling $v$ in so far as the worse case non-blocking situation is concerned, and hence $v=4r-2$. Since $r$ is always very very large, the value, $-2$, may be dropped and the equation becomes $v=4r$.

Having established the parameters which are necessary for a strict non-blocking situation let us examine FIGURE 8 which shows schematically the type of interconnections within the AIM's shown in FIGURE 7. Each of the AIM's in FIGURE 8 numbered by odd numbers 11 through 17 has four terminals again identified as $r$. In addition, each of the AIM's 11 through 17 has three connecting conductors identified as $v$. It will be recalled that $v$ is equal to the number BIM's and since each AIM has as many connecting conductors as there are second stage matrices or BIM's, $v$ is equal to the number of connecting conductors as well as the number of BIM's. The matrix arrangement in FIGURE 8 is not a strictly non-blocking arrangement, but for the purposes for which the arrangement is shown, it is not necessary to complicate the FIGURE with additional paths to provide a non-blocking network.

A study of FIGURE 8 is offered to show that for a large interconnecting system such as those which would be employed in a computer device, there is a threshold point above which the first and second matrix combination arrangement is better than a singular matrix.

In order to make a comparison between a large single matrix and the two stage array, consider FIGURE 9 in conjunction with FIGURE 8 wherein FIGURE 9 shows a single large matrix. As a representative arrangement we will consider the use of circuits which have one output terminal and an average of three input terminals. This is considered representative in view of the study of the computing machines of the UNIVAC series and in particular in consideration of the gate circuits therein.

Let the total number of terminals on the horizontal line of the single matrix 25 be denoted by $n$, and let us further define the total number of output terminals of the matrix 25 as $m$. Since the representative circuits average three input terminals per output terminal, it follows then that $n=4m$ in a representative type of computer single matrix. Considering FIGURE 8, let us define the total number of terminals as $n$. For purposes of easy computation $n$ has been chosen as sixteen or a perfect square. Let us choose to assign the $n$ terminals to four matrices, such that $r$ terminals which are assigned to each matrix have the value of the square root of $n$. Mathematically expressed $r=\sqrt{n}$. It should be understood, at this juncture, that $n$ might be any value but if it is chosen other than a perfect square the computation becomes complicated although the final result is not very different from the result determined hereinbelow.

Having considered or chosen $r$ equal to the square root of $n$ let us consider some further definitions. We denote the total number of AIM's as $u$. Consequently, $u\times r=n$. Also, since each BIM has a connecting link to each AIM then each BIM has $u$ terminals as shown in FIGURE 8. Furthermore, since a complete path through a BIM uses two terminals and one vertical conductor within the BIM, the number of vertical conductors need be only one-half the number of terminals, or $u/2$.

Now consider the maximum path length for the matrix arrangement of FIGURE 8 as compared to the matrix arrangement of FIGURE 10. It must be understood that the maximum path length is not only the actual path length over which a signal might travel from one terminal to another, but also includes all of the connected path lengths, since the connected path lengths (whether or not they are the actual paths for conduction) provide means for distributed or stray capacitance. For instance, the maximum path length from the input terminal K (FIGURE 8) of AIM 11 to the terminal J of AIM 17 through the BIM 21 would be equal to $2(v+r+u)$ units. To be more specific, assume that the length of wire, W (as shown in FIGURE 9), represents a unit of length and this unit could be in inches or centimeters or some other particular length. The path length of a horizontal conductor from any terminal would be $v-1$ unit; in other words the number of connecting conductors minus one, multiplied by the unit value, W, or the number of connecting conductors minus one multiplied by inches.

It should be kept in mind that it makes no difference whether or not the full distance of the conductor is used as the actual circuit path, because the full distance of the input conductor serves as a possible source of stray capacitance. In a like manner, the circuit path in the vertical direction is equal to $r-1$ units. Therefore, the maximum circuit path for an individual BIM is $v-1$ units plus $r-1$ units. Now since the maximum circuit path for AIM 11 would be the same as the maximum circuit path for AIM 17, the maximum circuit path for the two units would be $2(v-1+r-1)$ units. The maximum circuit path for BIM 21 is $(u/2-1+u-1+u/2-1)$ or $2u-3$.

If we consider now the total maximum path length from any terminal of AIM 11 to any terminal AIM 17 or in other words, a "long path," we find it is equal to $2[(v-1)+(r-1)+(u-3)]$ units. If $r$ is considered large and $v$ and $u$ are also considered large, as would be the case in a computer device, then for convenience $-1$ and $-3/2$ may be dropped and therefore the expression becomes $2(v+r+u)$ units.

As was discussed before if we have a strict non-blocking situation the equation is $v=4r$ and if $4r$ is substituted for $v$ the above expression for maximum length becomes $2(4r+r+u)$ units. Since the number of AIM's is also equal to $\sqrt{n}$, it becomes apparent that $u=r$. If we substitute $r$ in place of $u$ in the above expression for maximum length, the value for maximum length becomes $2(4r+r+r)$ units, or $12r$ units for a strict non-blocking network.

Now consider the maximum length between any pair of terminals for the single matrix 25 in FIGURE 9. It follows that from any terminal to any other terminal, the maximum path length is equal to $(m-1+n-1+m-1)$ units and when this mathematical expression is reduced and combined we find that maximum path length is $2m+n-3$. Again if $n$ and $m$ are large, as they would be in a computer device, the $-3$ term may be dropped, so that the maximum path length can be considered $2m+n$. As was mentioned earlier our representative single matrix is formed on the basis of $n=4m$ and therefore in terms of $n$, the maximum path length is $3/2n$ units.

Having determined the maximum path length for the signal matrix and for the two stage matrix arrangement of FIGURE 8 we find that these two expressions can be equated to determine the point at which the path lengths in the two systems are equal by the following equation:

$$(3/2)n=12r$$
$$(3/2)n=12\sqrt{n}$$
$$(9/4)n^2=144n$$
$$n=576/9=64$$

It follows then that when $n$ equals 64 the two path lengths are equal and that for any number of terminals greater than 64 the two stage matrices can provide less capacitance than the single matrix system. Obviously two stage matrix system is desirable for computers wherein $n$ is very much larger than 64, assuming as we did that $n$ equals $4m$.

In considering the maximum path length of FIGURE 8, the path length of the connecting conductors between the A and B matrices were not considered and were shown in the figure as dashed lines. In the actual assembly of the present invention the interconnecting links or connecting conductors the first stage AIM and the second stage BIM matrices are reduced to virtually a non-existent or zero path length, by arranging the second stage matrices orthogonally through the first stage matrices as shown by the isometric view of FIGURE 10, and the pictorial view of FIGURE 11.

For instance in FIGURE 10 the first stage matrices (AIM's) of FIGURE 8, 11 through 17, are shown stacked in positions orthogonally to two of the second stage matrices 19 and 21 of FIGURE 8. The BIM 23 is not shown, in order that the circuit path shown in FIGURE 8 can be easily shown in FIGURE 10. At each of the X marks, the second stage matrices are connected to the first stage matrices, and it can readily be seen upon inspection of FIGURE 11 that the circuit path shown by the dashed lines in FIGURE 8 are virtually non-existent. The path from terminal K to terminal J is shown in heavy line in FIGURE 10, and it represents the same circuit path as shown in FIGURE 8.

FIGURE 11 shows a pictorial of a second stage matrices being connected orthogonally to the first stage matrices and the cross-over points are shown as blocked areas such as block 37. The terminals such as terminal 39 are the terminals which go to the various circuit cards in the computer device. The arrangement of FIGURE 11 is a bifurcated arrangement such as discussed earlier wherein $v=4r-1$.

The present invention provides a means for effecting a strictly non-blocking interconnecting circuit means between any number of input circuits and further enables this non-blocking interconnecting means to be fabricated in such a fashion as to be housed in a very small device.

Certain assumptions were made in the foregoing discussion in order to provide some basis for the discussion. While these assumptions may not be true for every situation they represent a high degree of truth for every situation in data processing devices as known at present. Therefore the conclusions taught in the foregoing specification can be considered generally true for all interconnecting systems. For instance the points at which the present system becomes superior to a single interconnecting matrix may not always be 64 but it will always be some value close to 64 depending upon the interconnecting pattern to be satisfied. It should be further understood that while the foregoing description described the present invention in terms of printed circuit wiring or electrical ohmic circuits, the basic concept of two matrices being interconnected as described can be used to provide paths for any forms of energy, such as light.

The embodiment of the invention in which an exclusive property or privilege is claimed are defined as follows:

1. A non-blocking signal switching circuit comprising in combination: a $u$ number of first stage interconnection matrices, each of which has an $r$ number of electrical terminals, a plurality of associated terminal-conductors with each one assigned to a different one of said $r$ terminals and a $v$ number of connecting-conductors disposed substantially orthogonally to said terminal-conductors, wherein $v$ is equal to $4r-1$, each of said first stage interconnection matrices, having a plurality of interconnections between said terminal-conductors and said connecting-conductors, a $v$ number of second stage interconnection matrices, each of which has a $u$ number of connecting-conductors and a $u/2$ number of cross-conductors disposed substantially orthogonally to said connecting-conductors, each of said second stage interconnection matrices having a plurality of interconnections between said connecting-conductors and said cross-conductors, each of said first stage interconnection matrices having at least one different $v$ connecting-conductor connected, respectively, to an associated connecting-conductor of each of said second stage matrices so that electrical continuity can be provided between any electrical terminal of any first of said first matrices through one or more of said second matrices to any group of electrical terminals of others of said first matrices.

2. A non-blocking signal switching circuit according to claim 1 wherein each of said terminal-conductors is connected to two $v$ connecting-conductors thereby effectively bifurcating each $r$ electrical terminal.

3. A non-blocking signal switching circuit comprising in combination: a $u$ number of first stage interconnection matrices each of which has a plurality of electrical terminals, a plurality of associated terminal-conductors with one each assigned to each terminal and a $v$ number of connecting conductors disposed substantially orthogonally to said terminal-conductors, each of said first stage interconnection matrices being stacked to form a first packaging unit having a depth side corresponding to the depth of said stack, a $v$ number of second stage interconnection matrices each of which has a $u$ number of connecting-conductors and a $u/2$ number of cross-conductors disposed substantially orthogonally to said connecting-conductors, each of said second stage interconnection matrices having a plurality of interconnections between said connecting-conductors and said cross-conductors, said second stage interconnection matrices being stacked to form a second packaging unit having a depth side corresponding to the depth of said second packaging unit, said first and second packaging units being joined so that the depth side of said first packaging unit lies perpendicular and abutts the depth side of said second packaging unit, each of said first stage interconnection matrices having at least one different $v$ connecting-conductor connected, respectively, to an associated connecting-conductor of each of said second stage matrices at the point where said first and second packaging units are joined so that electrical continuity can be provided between an electrical terminal of a first of said first matrices through one of said second matrices to an electrical terminal of the second of said first matrices.

4. A non-blocking signal switching circuit according to claim 3 wherein said plurality of electrical terminals on each first interconnection matrix is equal to a number 4 and wherein the $v$ number of connecting-conductors is equal to $4r-1$ thereby providing that electrical continuity can be provided between any electrical terminal of any first of said first matrices through one or more of said second matrices to any group of electrical terminals of others of said first matrices.

5. A non-blocking signal switching circuit comprising in combination: a $u$ number of first stage interconnection matrices each of which has an $r$ number of electrical terminals, a plurality of associated terminal-conductors with one each assigned to a different $r$ terminal and a $v$ number of connecting-conductors disposed substantially orthogonally to said terminal-conductors wherein $v=4r-1$, each of said first stage interconnection matrices having a plurality of interconnections between said terminal-conductors and said connecting-conductors, a $v$ number of second stage interconnection matrices each of which has a $u$ number of connecting-conductors and a plurality of cross-conductors disposed substantially orthogonally to said connecting-conductors, each of said second stage interconnection matrices having a plurality of interconnections between said connecting-conductors and said cross-conductors, each of said first stage interconnection matrices having at least one different $v$ connecting-conductor connected, respectively, to an associated connecting-conductor of each of said second stage matrices so that electrical continuity can be provided between any electrical terminal of any first of said first matrices through one or more of said second matrices to any group of electrical terminals of others of said first matrices.

References Cited

UNITED STATES PATENTS

| | | | |
|---|---|---|---|
| 3,317,897 | 5/1967 | Ceonzo et al. | 340—166 |
| 2,901,547 | 8/1959 | Miloche | 179—18.7 |
| 3,129,407 | 4/1964 | Paull | 340—147 |
| 3,185,898 | 5/1965 | Ehlschlager | 340—166 |
| 3,291,914 | 12/1966 | Bowers | 179—18.7 |

JOHN W. CALDWELL, *Primary Examiner.*

D. J. YUSKO, *Assistant Examiner.*